United States Patent
Le Shiffer et al.

(10) Patent No.: US 7,831,067 B2
(45) Date of Patent: Nov. 9, 2010

(54) METHODS AND APPARATUS FOR AUTOMATED, MULTI-LEVEL RED EYE CORRECTION

(75) Inventors: Katerina Le Shiffer, Milpitas, CA (US); John Louis Warpakowski Furlan, Belmont, CA (US); Richard Tobias Inman, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1016 days.

(21) Appl. No.: 11/130,630

(22) Filed: May 16, 2005

(65) Prior Publication Data
US 2006/0257132 A1 Nov. 16, 2006

(51) Int. Cl.
*G06K 9/00* (2006.01)
(52) U.S. Cl. .................. 382/117; 382/118; 382/275; 382/158
(58) Field of Classification Search .......... 382/117, 382/167, 118, 275
See application file for complete search history.

(56) References Cited

U.S. PATENT DOCUMENTS

| 6,134,339 | A | 10/2000 | Luo |
| 6,718,051 | B1* | 4/2004 | Eschbach ............ 382/117 |
| 6,873,743 | B2 | 3/2005 | Steinberg |
| 7,126,629 | B1 | 10/2006 | Braunstein et al. |
| 7,224,850 | B2* | 5/2007 | Zhang et al. ............ 382/275 |
| 7,343,028 | B2* | 3/2008 | Ioffe et al. ............ 382/118 |
| 2002/0159630 | A1 | 10/2002 | Buzuloiu et al. |
| 2003/0044063 | A1* | 3/2003 | Meckes et al. ............ 382/165 |
| 2003/0044177 | A1* | 3/2003 | Oberhardt et al. ............ 396/158 |
| 2003/0044178 | A1* | 3/2003 | Oberhardt et al. ............ 396/158 |
| 2003/0142285 | A1* | 7/2003 | Enomoto ............ 355/77 |
| 2003/0223622 | A1* | 12/2003 | Simon et al. ............ 382/118 |
| 2004/0233299 | A1* | 11/2004 | Ioffe et al. ............ 348/239 |
| 2005/0094894 | A1* | 5/2005 | Yonaha ............ 382/275 |
| 2005/0248664 | A1* | 11/2005 | Enge ............ 348/222.1 |
| 2006/0088210 | A1 | 4/2006 | Yu et al. |
| 2006/0093212 | A1* | 5/2006 | Steinberg et al. ............ 382/167 |

OTHER PUBLICATIONS

"Pixologylriss—The World's Leading Automatic Red-Eye Removal Technology", IRISS, 8 pgs., Pixology, USA, Feb. 2004.
Lei Zhang, Yanfeng Sun, Mingjing Li, Hongjiang Zhang, "Automated Red-Eye Detection and Correction in Digital Photographs", 4 pgs., China, Aug. 2004.
Huitao Luo, Jonathan Yen and Dan Tretter, "An Efficient Automatic Redeye Detection and Correction Algorithm", Palo Alto, CA. 2004, Oct. 2004.
Non-Final Office Action for U.S. Appl. No. 11/130,634 mailed Dec. 10, 2007, 18 pages.

* cited by examiner

*Primary Examiner*—Daniel G Mariam
*Assistant Examiner*—Aklilu K Woldemariam
(74) *Attorney, Agent, or Firm*—Patterson & Sheridan, LLP

(57) ABSTRACT

Various methods and apparatus for multi-level red eye correction in a digital image are described. In an embodiment, a method receives an input that identifies an actual red eye in a digital image and a red eye candidate score associated with the actual red eye. The red eye candidate score of the actual red eye exceeds a detection threshold value. The method corrects the coloration of the actual red eye with a level of correction based on the red eye candidate score.

12 Claims, 10 Drawing Sheets

Red-Eye Detection System 300

METHODS AND APPARATUS FOR AUTOMATED, MULTI-LEVEL RED EYE CORRECTION

FIELD OF THE INVENTION

This invention generally relates to digital image processing, and more particularly to methods and apparatus for efficient, automated, multi-level red eye correction.

BACKGROUND OF THE INVENTION

Red-eye is a problem commonly encountered in photography when light, typically from the camera's flash, reflects off the retinas at the back of a subject's eyes and causes the pupils of the eyes of the people or animal in the image to appear an unnatural color, such as bright red. The retina contains many microscopic blood vessels between the light-sensing neurons and the center of the eye, so that the reflected light from the flash is colored by the blood in the vessels.

Red-eye has been a problem for many years, and although a variety of solutions have been proposed to cure the problem, these solutions tend to be costly, cumbersome, inefficient, and/or ineffective. One such solution is a pre-flash—firing the flash at a lower light level in advance of the normal flash illumination, thereby causing the subject's pupils to contract in time to make the subsequent flash illuminate a face with smaller pupils. These pre-flash solutions, however, are not always effective, and cause a delay (while the pre-flash is operating) before the picture is actually taken during which time the subject may move.

Attempts have also been made to cure the red-eye problem after-the-fact by processing the image to remove the red from the eyes. Computer software packages are available that allow for the removal of red-eye, such as by changing the color of the red portion of the eye. Some systems require manual selection, by the user, of the pixels within the image that are part of the red eyes prior to removing the red-eye. These systems may be rather user un-friendly due to the steps the user must follow to identify exactly which pixels are part of the red eyes.

Systems have attempted to automatically detect where the red-eye portions of an image are (as opposed to other non-eye portions of the image that are red). Such systems typically start by using face detection techniques to determine where one or more faces are in the image and where the eyes are within those faces. Once these faces (and eyes within them) are detected, the systems try to determine whether the eyes are red eyes. These systems, however, can have poor performance under many circumstances (e.g., when a face is partially obscured, such as by heavy shadows or heavy beards, when the face has an unusual expression or is distorted, etc.).

Other systems begin the detection process with eye detection. Once the eyes are detected, the system confirms whether the detected eyes are actually eyes by searching for a face around the detected eyes. However, these systems are time intensive and inefficient by requiring a significant amount of processing time and power. For commercially produced photos being produced on demand for consumers in a retail environment, these strategies may be too slow. Furthermore, prior solutions may be problematic with regard to correction of the identified red eyes.

SUMMARY OF THE INVENTION

In accordance with one aspect, a method for red-eye detection, includes identifying one or more red eye candidate zones within an identified skin region in a digital image, where a first red eye candidate zone is comprised of connected regions of pixels of a different color in the captured digital image than their natural color and where these connection regions exceed a minimum size. Detection of red eye also includes determining the first red eye candidate zone to be an actual red eye by comparing a red eye candidate score to a detection threshold value.

In accordance with another aspect, a method for red-eye correction includes receiving an input that identifies the location and size of an actual red eye in a digital image. The input also includes a red eye candidate score associated with the actual red eye, wherein the red eye candidate score of the actual red-eye exceeds a detection threshold value. Red eye correction also includes correcting the coloration of the actual red eye with the level of correction based on the red eye candidate score.

BRIEF DESCRIPTION OF THE DRAWINGS

The drawings refer to the invention in which.

Figure 1:
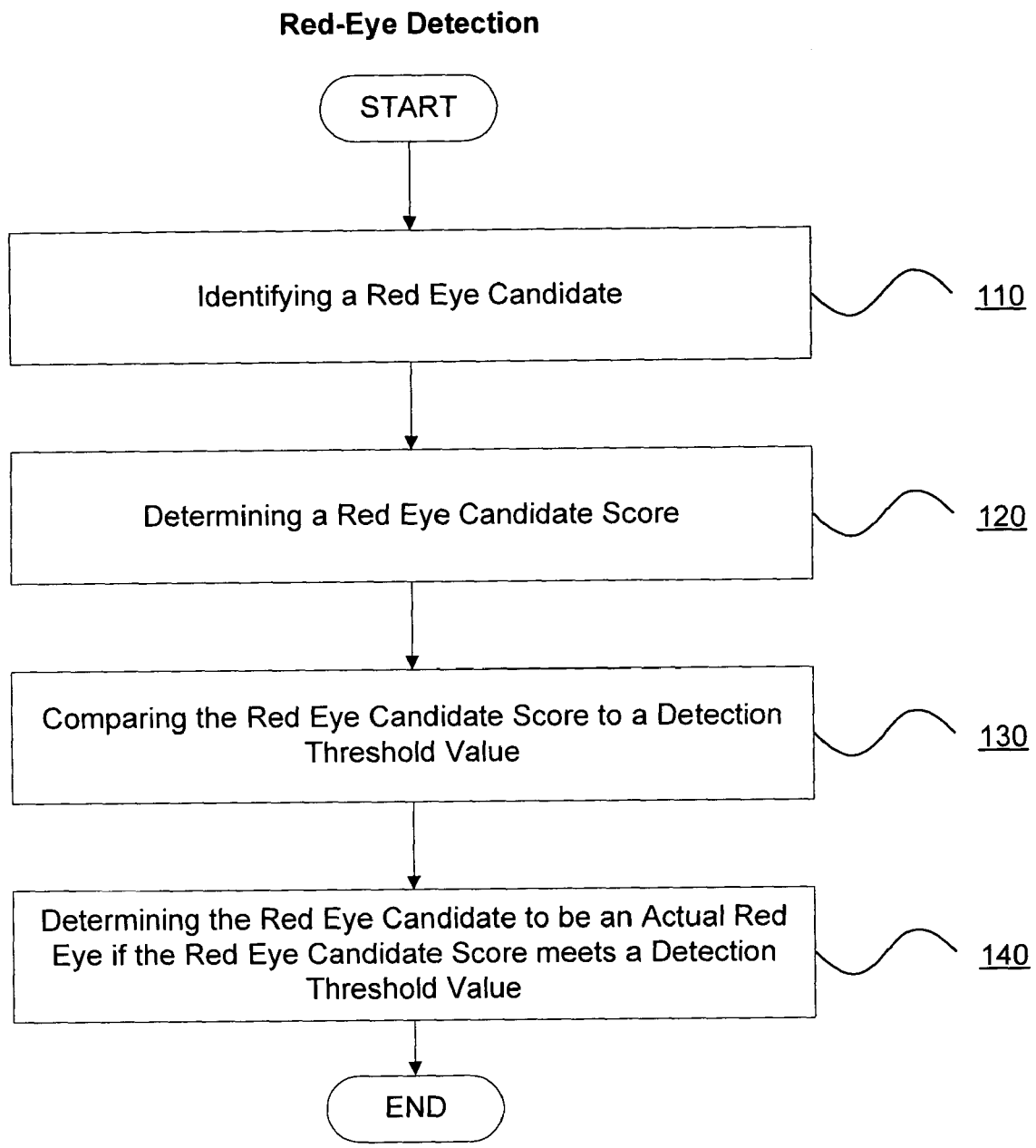
FIG. 1 illustrates an embodiment of a block diagram of a method of red eye detection.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific red eye features, named components, connections, types of correction, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Further specific numeric references such as first red eye candidate zone, may be made. However, the specific numeric reference should not be interpreted as a literal sequential order but rather interpreted that the first red eye candidate zone is different than a second red eye candidate zone. Thus, the specific details set forth are merely exemplary. The specific details may be varied from and still be contemplated to be within the spirit and scope of the present invention.

In general, various methods and apparatus to detect and/or correct red eye in a digital image are described. In an embodiment, a method identifies one or more red eye candidate zones within an identified skin region in a digital image. A first red eye candidate zone includes connected regions of pixels of a different color in the digital image than their natural color and exceeds a minimum size. The first red eye candidate zone is determined to be an actual red eye by comparing a red eye candidate score to a detection threshold value. One or more eye features may be analyzed. Each eye feature has a maximum score value associated with that eye feature. The current score values of the one or more eye features may be summed to determine the red eye candidate score.

In addition, the red eyes in the digital image may be corrected. An input may be received that identifies the size and location of an actual red eye in the digital image and a red eye candidate score associated with the actual red eye. If the red eye candidate score of the actual red-eye exceeds a detection threshold value, then a correction may be applied. Similarly if an actual red eye is manually identified then a correction may be applied. The coloration of the actual red eye may be corrected with one or more levels of correction based on the red eye candidate score.

FIG. 1 illustrates an embodiment of a block diagram of a method of red eye detection. The following method may be implemented as an algorithm coded in software, hardware logic, or a combination of both. In block 110, the red eye detection method identifies a red eye candidate. The algorithm may identify one or more red eye candidate zones within each identified skin region in a digital image. In block 120, a red eye candidate score is determined. Each eye feature has a maximum score value associated with that eye feature. The current score values of the one or more eye features may be summed to determine the total red eye candidate score. In block 130, the red eye candidate score is compared to a detection threshold value. The detection threshold may be adjustable. A designer of the red eye detection algorithm can change the score thresholds to allow for conservative and aggressive red eye detection. In block 140, the red eye candidate is determined to be an actual red eye if the red eye candidate score meets a detection threshold value. A more detailed discussion is presented below with regard to FIG. 3.

Figure 2:
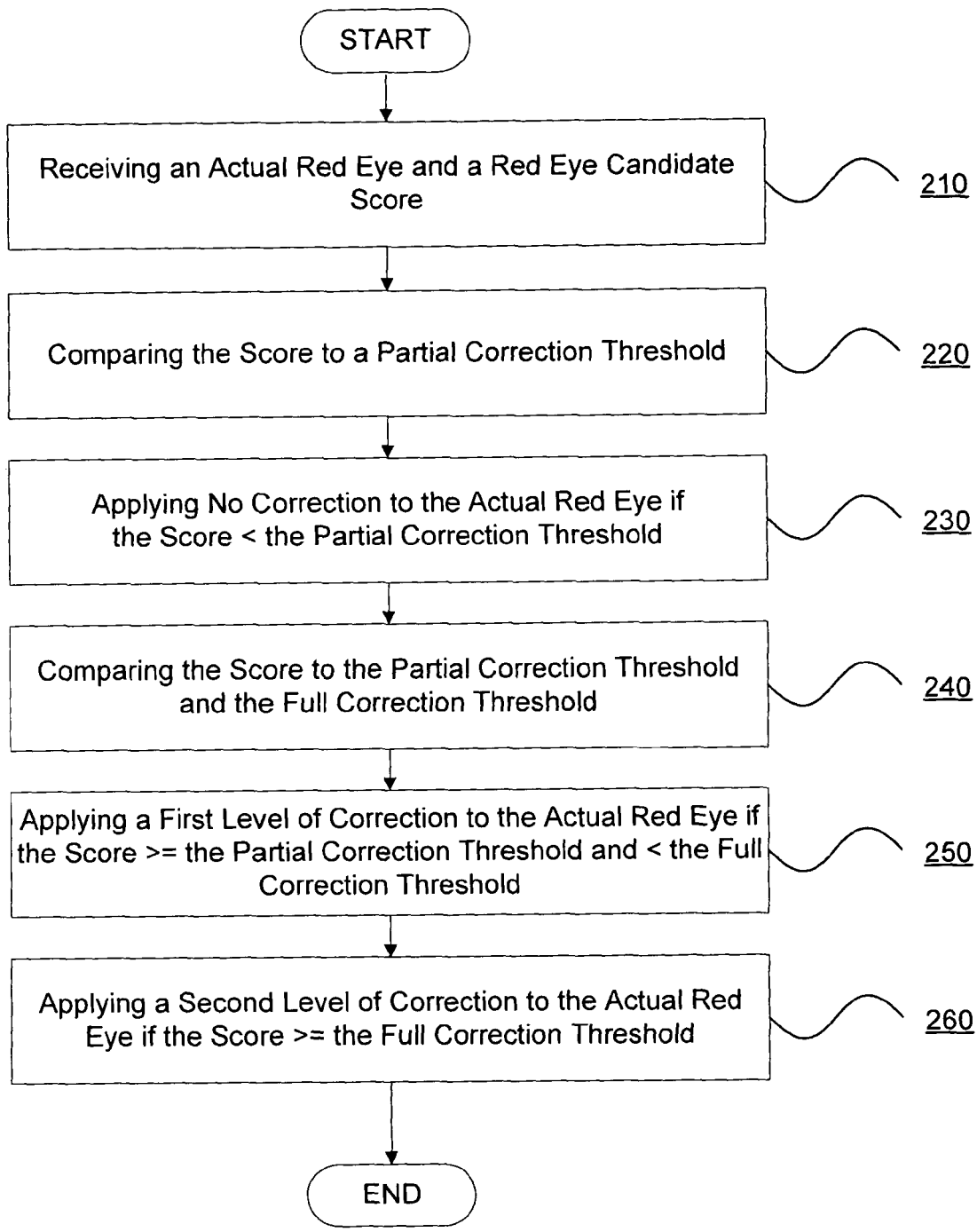
FIG. 2 illustrates an embodiment of a block diagram of a method of red eye correction.

FIG. 2 illustrates an embodiment of a block diagram of a method of red eye correction. The following method may be implemented as an algorithm coded in software, hardware logic, or a combination of both.

In block 210, an actual red eye and a red eye candidate score are received. An input that identifies an actual red eye in a digital image and a red eye candidate score associated with the actual red eye zone, wherein the red eye candidate score of the actual red-eye exceeds a detection threshold value.

In block 220, the red eye candidate score is compared to a partial correction threshold. The coloration of the actual red eye may be corrected with two or more levels of correction based on the red eye candidate score. A first level of correction may be a partial color correction. In block 230, the actual red eye is not corrected if the red eye candidate score does not meet or exceed a partial correction threshold.

In block 240, the red eye candidate score is compared to the partial correction threshold and the full correction threshold. In block 250, a first level of correction is applied to the actual red eye if the red eye candidate score falls between the partial correction threshold and the full correction threshold. The amount of correction to be applied to the actual red eye may be based upon a sum of scores from all the features examined. Thus, a first level of correction may be a partial color correction and merely the partial color correction is applied because of the sum of scores from all the features examined. In block 260, a second level of correction is applied to the actual red eye if the red eye candidate score meets or exceeds the full correction threshold. The full correction threshold may apply a more thorough color and intensity correction.

A more detailed discussion is presented below with regard to FIG. 4.

Figure 3A:
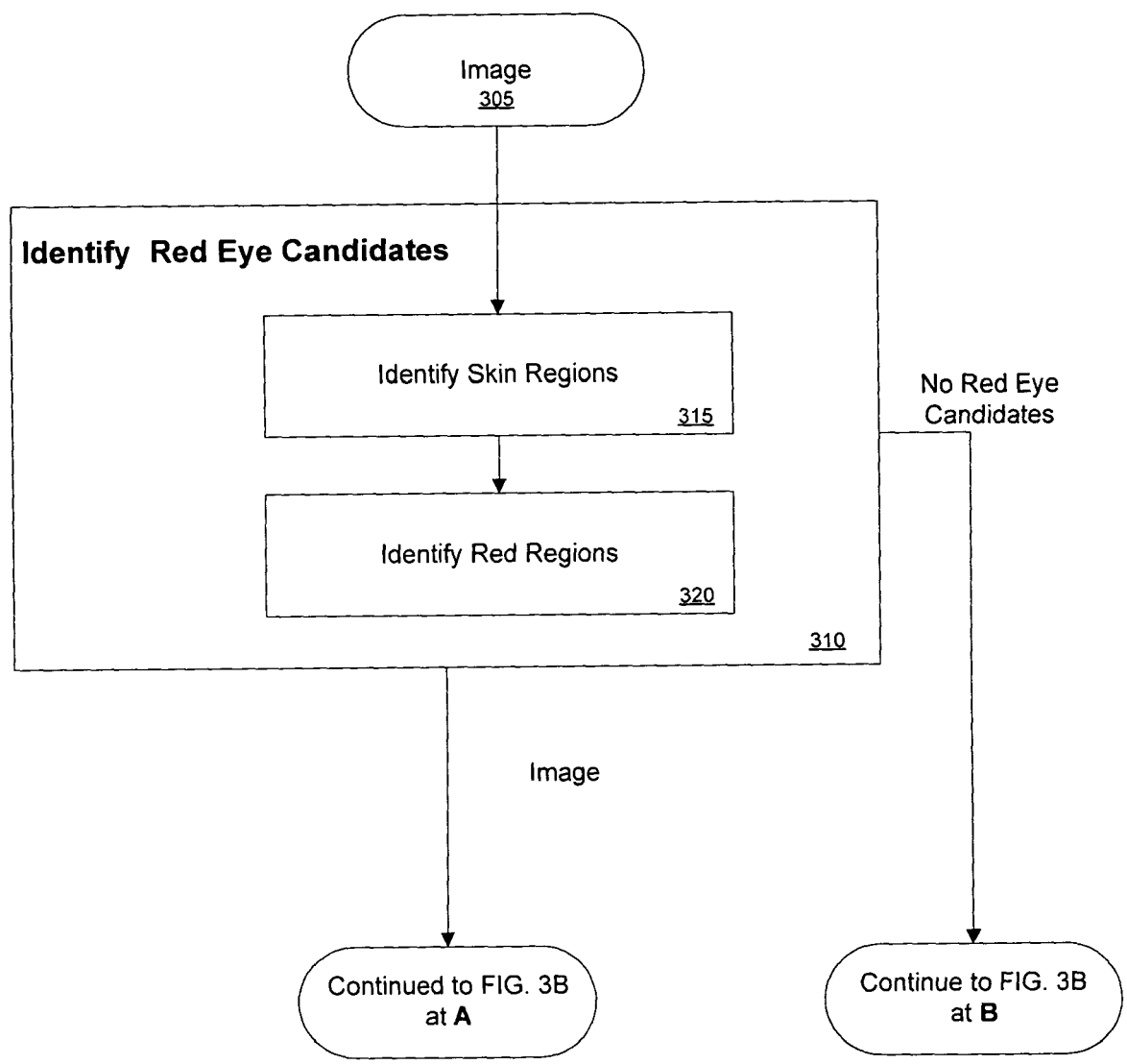
FIGS. 3a-3c illustrate a flow diagram through the operation of an embodiment of red eye detection.
Figure 3B:
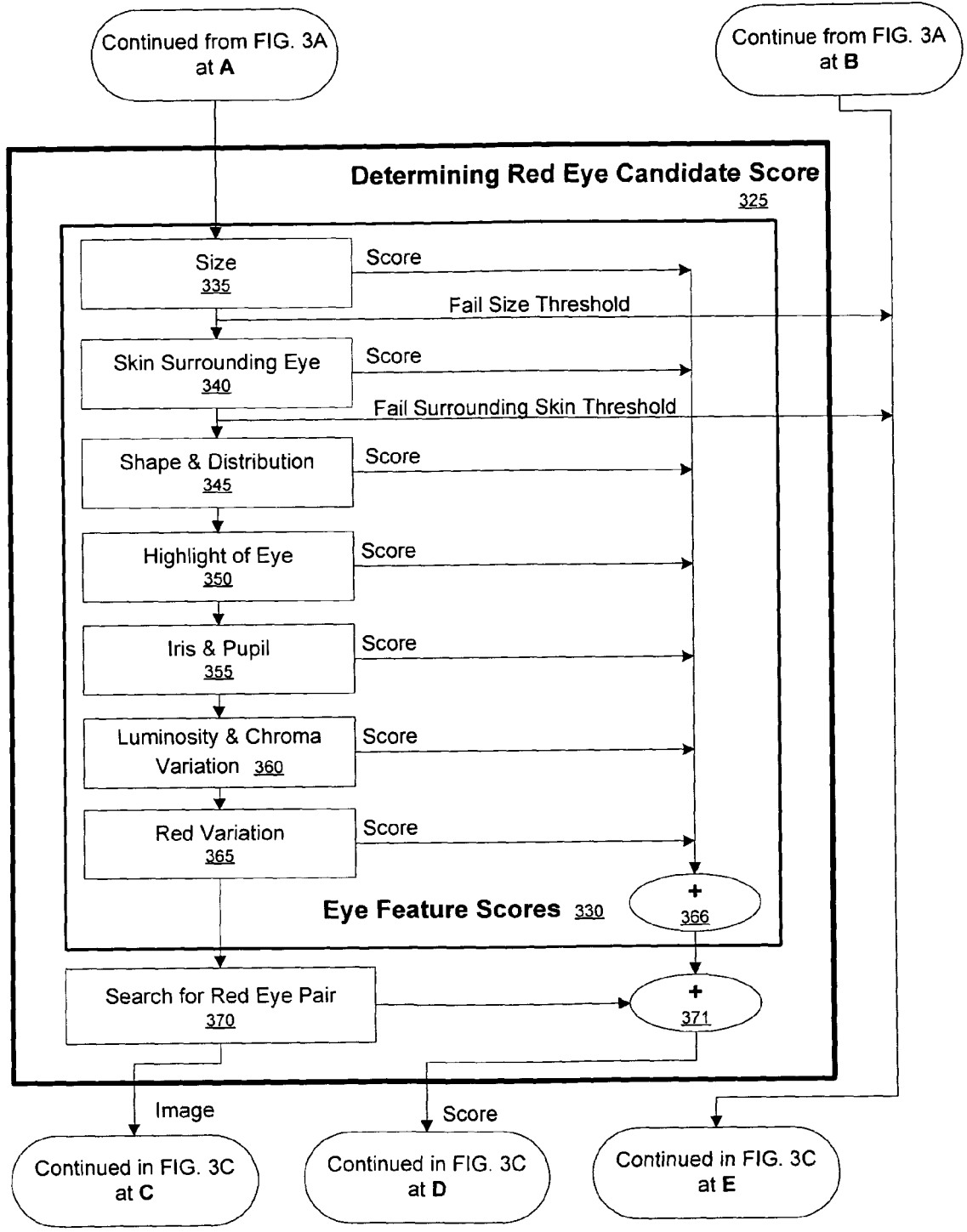
Figure 3C:
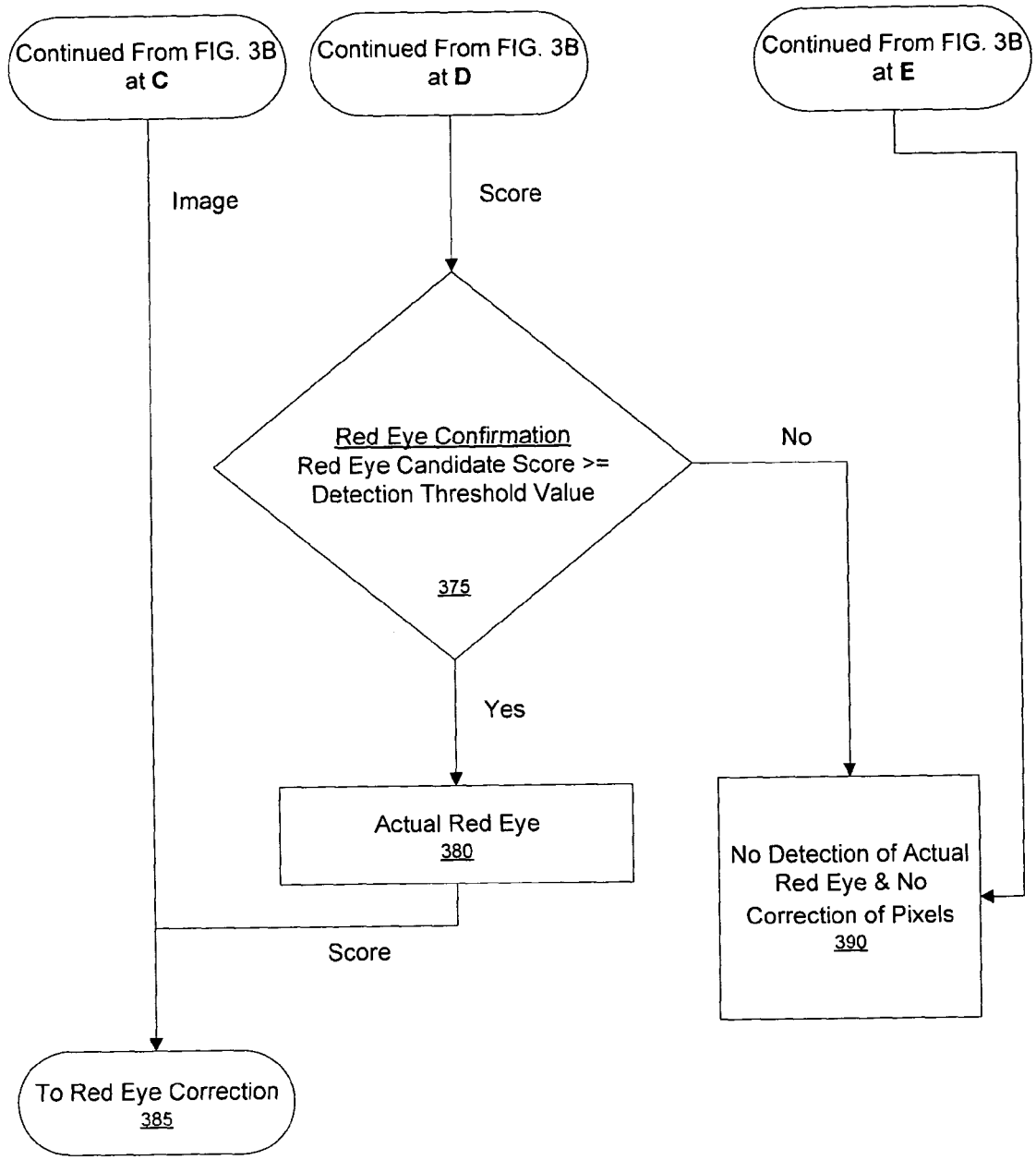

FIGS. 3a-3c illustrate a flow diagram through the operation of an embodiment of a red eye detection algorithm. The red eye detection system 300 can be implemented in any of a wide variety of devices, such as computers (whether desktop, portable, handheld, kiosks, etc), image capture devices (e.g., camera 700 of FIG. 7, camera 815 of FIG. 800), etc. Alternatively, the red eye detection system 300 may be a standalone system for coupling to (or incorporation within) other devices or systems.

System 300 receives an image 305 into a red eye candidate identification module 310. In one embodiment, the image 305 is received in digital format.

Identification of Red Eye Candidates

The red eye candidate identification module 310 quickly identifies possible red eye candidate zones in the image by first, identifying one or more skin regions in module 315 and second, identifying one or more red zones/regions in module 320. The goal of setting the detection threshold is to make sure that the red eye detection system 300 detects all actual red eyes in the image which includes the risk of identifying a number of red eye false positives. The detection algorithm may try to classify pixels as indicating skin tone or red eyes based on the red, green, and blue light values captured by that pixel and its associated chroma and luminance values. The approach of beginning the detection process with identifying skin pixels is based on the notion that the eyes are merely present in faces and faces are comprised of skin, which effectively narrows the search for candidates. Since face and eye detection is computationally intensive, the task of identifying red eye candidates is simplified by looking for skin regions without performing face detection. Searching for color is faster than searching and verifying for a feature, such as an eye or face. In one embodiment, when the red eye detection algorithm searches for skin regions, the system matches color from the pixels in the image with the color model. This is effectively a compare against thresholds, which is computationally fast. In one embodiment, by executing the skin detection prior to examining eye features, fewer pixels in the image require examination with the more computationally intensive eye feature detection algorithm. Within the identified skin regions, red regions, which may be part of a red eye are identified. Each connected red region within the skin region is considered a red eye candidate and is passed on to the next module for verification.

In the following example, skin tones areas in the digital image are detected by analysis of pixel values in a normalized color map. The pixel values in the normalized color map from the digital image are then compared against one or more skin tone models.

The skin region identification module 315 begins by constructing a model for skin tones. In one embodiment, the models are pre-computed from a database of what skin tones may look like. In one embodiment, the models are loaded-in, rather than constructed at the time of processing. An exemplary skin model 510 is illustrated in the Normalized Color Map 500 of FIG. 5. The constructed skin model 510 may be formed on a normalized skin color map 500 and include a luminance threshold and a set of chroma thresholds.

The skin region identification module 315 receives the digital image 305. The process of identifying skin regions continues by comparing normalized chroma channels of the digital image 305 to the skin model 510. The pixels in the digital image may be compared to the constructed skin model. Each pixel in the digital image is labeled as a skin pixel or non-skin pixel in a binary map. In an alternative embodiment, a subset of the pixels in the digital image is analyzed. A pixel of the digital image 305 is labeled as skin if the pixel luminance and a set of chroma values of the pixel fall within a luminance threshold and a set of chroma thresholds of the skin model. The luminance threshold is set at a fraction of the mean luminance of the whole image. This accounts for the differences in flash strength among cameras, in ambient lighting, and in the distance between the camera and the subject(s).

A chroma value may be a quality of color combining hue and saturation. Saturation is a chromatic purity indicating freedom from dilution with white. Essentially, chroma can be indication of a particular color on the color spectrum rainbow. A luminance value may indicate the luminous intensity (amount of reflected light) of a surface in a given direction per unit of projected area.

There are many ways to normalize the chroma channels. In one embodiment, normalization is performed using a blue divided by red ratio (Blue/Red) compared to a green divided by red ratio (Green/Red). The chroma thresholds vary depending on how far the image pixel value is away from the high end of the dynamic range. This is to account for saturation near the high end of the color spectrum.

It may be noted that skin tones of different races are similar once the color channels are normalized on the B/R to G/R normalized color map. Additionally, objects in an image, such as a wooden object 620 and brown-colored walls may be easily mistaken as skin tones. Further, red objects such as an apple 635 on the wooden table 620 may be mistaken as an actual red eye because the wooden table 620 surrounds the apple 635.

Once all skin pixels are labeled, connected skin regions are found using a standard connected-component algorithm. Each skin region that passes a minimum size is a possible zone to search for red eye candidate regions. Skin regions failing the minimum size requirement are eliminated from further computation.

The red region identification module 320 begins by constructing a model for red tones 520 within the identified skin regions. In one embodiment, as with skin models, the red models are pre-computed from a database of what red eyes may look like and are loaded-in at the time of red eye detection, rather than constructed at the time of processing. The constructed red model is formed on a normalized color map and includes a luminance threshold and a set of chroma thresholds. An exemplary red model 520 is illustrated in the Normalized Color Map 500 of FIG. 5.

The red region identification module 320 receives pixels from the digital image 305. The red regions may be connected regions of pixels of a different color in the digital image than their natural color. Note, humans have red eyes in digital photos, dogs may have greenish eyes in digital photos, etc. The red model may change with both lighting conditions and the species of the subjected that is to have its eyes corrected back to more a natural color for that species. In another embodiment, the red region identification module receives those areas of image 305 that include the identified skin regions, thereby allowing red region identification module 320 to analyze merely those pixels that are within the areas that include skin regions. The process of identifying red regions continues by comparing the same normalized chroma channels of the digital image 305 to the red model 520. Each pixel in the identified skin regions of the digital image is labeled as red pixels or non-red pixels in a binary red map. Thus, a plurality of pixels from within the digital image are compared to the red model. Each pixel of the plurality of pixels may be labeled as a red pixel if a luminance value and a set of chroma values of the pixel fall within the luminance threshold and the set of chroma thresholds of the red model. In an alternative embodiment, a subset of the pixels in the identified skin regions is analyzed.

In order for a pixel to be labeled as a red pixel, the pixel Red, Green, and Blue chroma values should fall within a certain range. In addition, the normalized Blue/Red and Green/Red pixels of the digital image 305 should fall within certain thresholds. These thresholds vary depending on the strength of the red channel, the overall luminance of the image, and the luminance of the particular skin region being searched.

Once the binary red map within the skin regions has been determined, connected red regions are found using a standard connected-component algorithm. Each connected red region that passes a minimum size is a red eye candidate zone. Also, skin regions failing the minimum size requirement are eliminated from further computation. Thus the algorithm may identify one or more red eye candidate zones within one or more identified skin regions in the digital image.

Determining Red Eye Candidate Scores

The red eye candidate score module 325 scores the red eye candidates based on eye features. In the red eye candidate identification module 310, the goal may be to capture all red eye candidates at the expense of detecting false candidates that are not eyes. Exemplary false red eye candidates may include lips, other red patches present on the face, and red polka dots on a brown-toned shirt. Scoring the red eye candidates based on presence of eye features and rejecting the candidates with scores that do not meet a detection threshold value aids in eliminating the amount of false positives.

One advantage of this method and system is that the minimum acceptable score comprising the detection threshold value, can vary the conservativeness or aggressiveness of the red eye detection system 300. A conservative detector may not have any false positives at the expense of missing few actual red eyes. On the other hand, an aggressive detector will find almost all actual red eyes but will also detect false positives, such as other red regions that are not eyes. In one embodiment, the red eye detection system 300 is set for conservative detection with a higher detection threshold value. In another embodiment, the red eye detection system 300 is set for aggressive detection with a lower detection threshold value. It may be noted that correcting a false positive red eye candidate creates a far more noticeable artifact than missing few actual red eyes.

Eye Feature Scores

The feature score module 330 receives pixels from the digital image 305. In an alternative embodiment, the module 330 receives a subset of pixels from the image comprising merely the identified red eye candidate zones. The feature score module 330 looks for a number of eye features in each red eye candidate zone. A score is given for each feature based on a non-binary likelihood that the particular feature is present in the red eye candidate. For example, negative scores may be used to indicate the lack of a feature. Every feature is scored independently. Moreover, features may be weighted in relation to the other features.

To illustrate these concepts, consider Features A, B, and C. The features may be weighted, such that the presence and absence of Feature A is more indicative of determining whether the red eye candidate zone is an actual red eye. Accordingly, the red eye candidate zone may receive a maximum score of 6 for Feature A. The maximum score allocated for Feature B may be 3, and Feature C, which is of marginal importance, may have a maximum of score of 1. The feature scores may be based on a non-binary likelihood that the particular feature is present. Accordingly, if the system 300 has high confidence, but not the highest confidence, that the red eye candidate zone includes feature A, then the score for feature A may be 5. A low confidence for feature B may result in a score of 1. The highest confidence for feature C results in the maximum scaled score of 1. In an alternative embodiment, negative scores, indicating a level of confidence of the absence of the feature, may be implemented within the system.

Thus, one or more eye features may be analyzed. Each eye feature has a maximum score value associated with that eye feature. Example eye features may be a maximum size, a minimum size, a surrounding skin, a circular shape, an even distribution, a highlight region, an iris and a pupil, a luminosity variation, a chromatic variation, a red variation and other characteristics associated with eyes.

The overall feature score is generally the sum of all the features scores. Thus, the current score values of the one or more eye features may be to determine the red eye candidate score. The maximum score value of each eye feature may be weighted in relation to the maximum score value of other eye features. In one embodiment, the failure of a key eye feature terminates further red eye detection and correction computation. If a red eye candidate zone absolutely failed a key eye feature, the red eye candidate score is set to zero. Key eye features may include features that are generally present in all images that have eyes independent of the angle of the subject in the image or other similar factors. In one embodiment, key features include a size range for the red eye candidate zone and the presence of skin pixels surrounding the red eye candidate zone. The analyzing of eye features may occur in a specific sequential order. The analysis of an initial eye feature, being a key eye feature, can potentially result in a failure of a red eye candidate zone and ends any further analysis of that red eye candidate zone. The speed of the red eye detection algorithm may be increase by detecting for skin tone regions prior to the score analysis of each eye feature and by sequentially examining key eye features first.

The skin tone filtering steps eliminates the potential number of red eye zone candidate zones that need to be analyzed prior to comparing the candidates against a red eye model on the normalized color map. Moreover, examining the key eye features such as the size ratio feature and the skin surrounding the eye feature, which can fail a candidate all by themselves, in the initial part of the sequence of the skin tone filtering steps reduces the amount of analysis the down stream filtering steps must examine.

Note, under this framework, additional features may be added to make the red eye detection system 300 more robust. In one embodiment, the following features comprise the features examined in the red eye candidate zones:

Size 335 (may be an example key feature): The feature score for a maximum size feature may be determined as follows. A size of the first red eye candidate zone is compared to a maximum size threshold. A size of the first red eye candidate zone is compared to a minimum size threshold. Red eye candidate zones that are above a maximum size or below a minimum size are eliminated from consideration. Thus, a first red eye candidate zone is identified as not an actual red eye if the size of the red eye candidate zone exceeds the maximum size threshold or falls below the minimum size threshold. The red eye candidate zone is not an actual red eye and no further processing is performed on these red eye candidate zones. Failing all of the red eye candidate zones that will later be determined to be false red eyes at the beginning of the red eye candidate scoring analysis can save a significant amount of further processing and time.

Surrounding Skin 340 (may be an example key feature): The feature score for a surrounding skin feature may be determined as follows. From the white of the eye, an outer bounding box surrounding the eye is estimated. The outer bounding box indicates where skin pixels should be found. The ratio of the number of skin pixels to non-skin pixels within the outer bounding box is computed. An inner bounding box, also called an eye box, surrounding a pupil, iris, and an eye white region of the red eye candidate zone, is estimated. The ratio of the number of skin pixels to non-skin pixels found within the inner bounding box is computed. Thus, an outer bounding box surrounding the first red eye candidate zone indicating where skin pixels should be found is estimated along with an inner bounding box surrounding a pupil, iris, and an eye white region of the first red eye candidate zone. Lastly, the difference between the ratio of skin/non-skin pixels within the outer box and the ratio of skin/non-skin pixels within the inner box is computed.

The surrounding skin score is based on thresholds of the outer and inner bounding box ratios. A successful red eye candidate zone may have a high skin/non-skin ratio within the outer bounding box and a low skin/non-skin ratio within the inner eye box. The surrounding skin score is based on the outer and inner ratios.

If the difference between the outer ratio and inner ratio is too small (does not meet a threshold) or negative, the red eye candidate zone is eliminated completely. The red eye candidate zone is not a red eye and no further processing is performed on these red eye candidate zones.

Shape and Distribution 345: In general, an eye is circular in shape. In one embodiment, the method determines the height and width of the red eye candidate zone. The ratio of width to the height may be roughly near 1, as indicative of a circular shape. The ratio may not be too large or too small, which would indicate a non-circular shape.

With regard to distribution, the red pixels within the red eye candidate zone inner bounding box may be roughly evenly distributed. For both shape and distribution, a perfect circle is not expected for numerous reasons. The shape of the eye, the position of the eyelid, and facial expressions all tend to distort the visible eye region from a perfect circle. Except in small children, the visible iris and pupil are almost never circular. The shape and distribution score is based on the width/height ratio and the red pixel distribution. In one embodiment, separate scores are determined for these features.

Highlight of the eye 350: The highlight or glint of the eye is examined. The highlight is generally located in the red region of the red eye candidate zone. Additionally, the highlight may also be located in the red region's immediate spatial vicinity. In order to identify the presence of the highlight, the system 300 looks for highlight pixels that are significantly brighter than surrounding pixels. The highlight score is based on (a) the difference in luminance between the glint and the non-glint region; (b) the shape and distribution of the highlight that may be roughly circular; and (c) the location of the glint with respect to the center of the red candidate.

Iris and Pupil 355: Generally, the red region of an actual red eye is located in the pupil. The iris is the non-red eye region immediately surrounding the pupil. In some cases, the presence of the red region appears in both the pupil and the iris. Outside the iris is the white of the eye.

For this feature, the iris and pupil are searched and examined. In one embodiment, this feature is comprised of two separate scores. The change in the luminance between the iris and pupil is examined and scored. Then the change in the luminance between the iris and the white of the eye is examined and scored.

The search for the iris and pupil begins outward from the red pupil to locate the boundary of the iris. The luminance of the iris and pupil is determined. The ratio of the iris luminance to the pupil luminance should fall below certain thresholds.

Next, the white of the eye is searched. Once the boundary of the iris is found, the size of the iris is used to estimate the size of the white portion of the eye. The luminance of the iris is determined. The luminance of the white portion of the eye is determined. Finally, the ratio of the iris luminance to the white portion luminance should fall below certain thresholds.

In a normal eye, the pupil is generally darker than the iris. However, for a red eye, this is not always the case. The red region, which is located in the pupil, may not be darker than the iris. Accordingly, the luminance ratio between the iris and pupil may be too unreliable to be used in scoring the feature. Thus, the ratio of the luminance of the iris and pupil is a more accurate indicator of the presence of an iris and pupil. In one embodiment, the pupil and iris score is based solely on the luminance ratio between the iris and the white of the eye.

Luminosity and Chroma Variation 360: The system 300 looks for significant variation in luminosity and chroma within an inner bounding box or an eye box. Absent significant variation, the red eye candidate zone is penalized with a lower score. As previously discussed, an inner bounding box, also called an eye box, surrounding a pupil, iris, and an eye white region of the red eye candidate zone, is estimated. Within the inner bounding box, significant variation in both luminosity and chroma between the white of the eye and the pupil/iris is expected. Examining the luminosity and chroma variation may catch false positive candidates, such as red blotches on the skin. The luminosity and chroma score is based on the variation within the inner bounding box.

Red Variation 365: In one embodiment, the definition of red may be expanded to allow for the identification of pixels as red pixels of slightly different red hues. The red variation module 365 begins by receiving the image 305 or a subset of the image 305. An expanded model for red is constructed. An exemplary expanded red model 530 is illustrated in the Normalized Color Map 500 of FIG. 5.

After the expanded red model is constructed, the immediate vicinity of the previously identified red region is searched for pixels and regions that satisfy the expanded red model. In an actual red eye, it is not expected to find in the immediate area surrounding the red pupil, e.g. the iris and the white of the eye, red regions according to the expanded red model. In one embodiment, the shape of the red region and the number of red pixels found is examined and determinative of the red variation score.

The red region may have changed its shape after applying the expanded red model 530. If the change in shape is significant from the shape initially identified and estimated by the red model 520, then it may be determined that the red eye candidate zone is not an eye and no further processing may be performed on the red eye candidate zone.

If the number of red pixels found according to the expanded red model 530 exceeds a threshold, the candidate is penalized with a lower score. This is to catch false candidates such as makeup on lips and red clothing.

In one embodiment, a subset of these features may be considered in determining the total feature score. Thus a red eye candidate zone is determined to be actually red eyes by analyzing merely a subset of the eye features rather than all of the eye features needing to be present to compare all of them against known eye models. In another embodiment, the feature scores of each of the preceding features are summed together. Block 366 receives the individual feature scores of multiple features. The output of block 366 comprises the total feature score.

Note, a maximum score value of each eye feature may be based on a non-binary likelihood that the eye feature is likely to be present in the red eye candidate zone.

Identifying Eye Pairs

After the red eye candidate zones have been scored, eye pairs are searched in the red eye pair search module 370.

The red eye pair search module 370 receives the digital image 305. In an alternative embodiment, the module 370 receives a subset of the image. The red eye pair search module 370 looks for a number of pair features in each red eye candidate zone. A score is given for each pair feature based on a non-binary likelihood that the particular pair feature is present in the red eye candidate zones. For example, negative scores may be used to indicate the lack of a pair feature. Every pair feature is scored independently. Moreover, pair features may be weighted in relation to the other pair features. Thus, the eye pair score may be the sum of a plurality of characteristic scores. The characteristic score is based on a non-binary likelihood that a first red eye candidate and a second red eye candidate meet a characteristic threshold.

Experimentation has shown that correcting the one red eye and not the partner, that is, not correcting the pair of red eyes, where the pair is located in the same face is perceptually more unnatural than leaving both red eyes uncorrected. The system 300 attempts to locate the pair of red eyes. If a partner for the red eye candidate zone is found, the eye pair score of both red eye candidate zones is boosted. In the case a partner for the red eye candidate zone is not found, the eye pair score of the red eye candidate zone is lowered. In one embodiment, the eye pair score is lowered such that later correction will not be aggressive. In another embodiment, if a partner is not found, the single red eye candidate zone is corrected to a first correction level. The first correction level is described in more detail below.

In searching for pairs, the red eye pair search module 370 considers multiple pair features. Under this framework, additional features may be added to make the red eye detection system 300 more robust. In one embodiment, the following pair features comprise the features examined in the red eye candidate zones:

Eye size Correlation: The eyes of the red eye candidate zones should be roughly the same size. The eye size of a first red eye candidate zone is compared to the eye size of a second red eye candidate zone. If the ratio of the first red eye candidate zone eye size and the second red eye candidate zone eye size fall within a threshold, the eye size correlation score is boosted. The threshold value considers the possibility of the subject's face being aligned at a plane that is not parallel to the image capturing device, such as the camera.

Distance between the red eye candidate zones: The distance between the red eye candidate zones is examined. The distance thresholds are based on known proportions of the human face. The distance thresholds consider the possibility of the subject's face being aligned at a plane which is not parallel to the image capturing device faces, such as if the subject is slightly turned away from the camera.

Belonging to a Same Skin Region: Both eyes of the red eye candidate zones should be surrounded by skin pixels from the same connected face region. The same skin region score is based the likelihood the eyes are within the same face region.

Orientation: The orientation of the eyes of the red eye candidate zones is computed. Pairs of eyes that are close to horizontal (or vertical, in the case the image was taken in portrait mode) are favored. For example, a first red eye candidate zone may not be expected to be oriented at a significantly skewed angle from a second red eye candidate zone. The orientation score reflects the likelihood that the pair of red eye candidate zones are horizontal or vertical.

Locating Additional Facial Features: If the above checks do not indicate a definite pairing, a search for other facial features within the same skin region is performed. Other facial features may include a mouth and a nose.

In one embodiment, a subset of these pair features may be considered in determining the total pair score. In another embodiment, the pair feature scores of each of the preceding features are added together. The red eye pair search module 370 outputs the total pair feature score.

Block 371 receives as inputs the total feature score from block 366 and the total pair feature score from the red eye pair search module 370. Block 371 adds the total pair feature score to the total feature score and outputs the red eye candidate zone score for the particular red eye candidate zone.

Red eye confirmation module 375 receives the red eye candidate score from block 371 and compares that score to a detection threshold value. The confirmation module 375 confirms the red eye candidate zone as being either part of an eye or not part of an eye, and outputs an indication of the detected region 380 that is confirmed as being part of an eye. In one embodiment, the red eye candidate score is passed to block 385. The value of the detection threshold is adjustable by the user to adjust the aggressive/conservative red eye candidate nature of the algorithm. Thus, a first instance of a red eye detection algorithm may establish a first detection threshold value and a second instance of the red eye detection algorithm may establish a second detection threshold value.

The detected actual red-eye regions or the complete image can then be made available to other systems for further processing, such as automatic correction of the actual red-eye regions (e.g., by changing the red color to a reddish-brown tone or by filtering the brightness of the red pixels), as indicated by block 385. In the case the red eye candidate zone was not detected as an actual red eye, no correction will be applied to the red eye candidate zone, as indicated by block 390.

In an embodiment, as discussed above, the score for each eye feature may not be binary. Each feature has a different maximum score (thus making the features weighted with respect to the other features). If the red eye detection algorithm is sure that it has found an eye feature, the score would be maximum, otherwise the current score could be lower than the maximum. If the red eye detection algorithm is sure that the feature is not present, the red eye detection algorithm may also penalize the red eye candidate zone by giving it a negative score for that eye feature. Thus the red eye detection algorithm may assign a negative score for missing eye features.

Likewise, the eye pair score may also not be binary. The red eye detection algorithm may check for the best fit of pairs and score them according to how likely they are to belong to the same face. The red eye detection algorithm may add the pair score to each individual eye score. For example, if eyeA has a score of 2 and eyeB has a score of 5, and their pair score is 3, eyeA will end up with 5 and eyeB will have a score of 8. Note, the red eye detection algorithm may also penalize by giving negative pair score.

Correction

Figure 4:
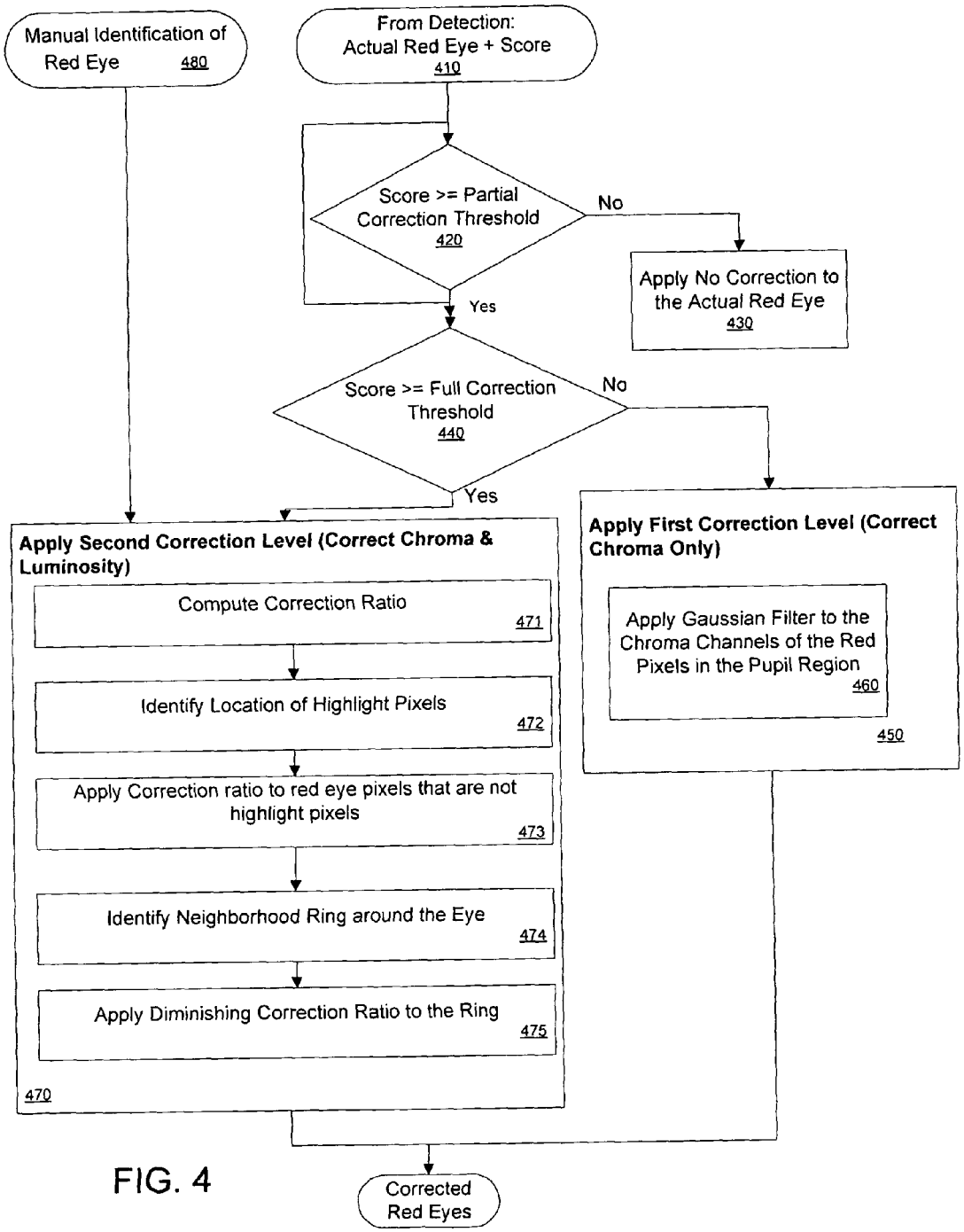
FIG. 4 illustrates a flow diagram through the operation of an embodiment of red eye correction.

FIG. 4 illustrates a flow diagram through the operation of an embodiment of red eye correction.

The red eye correction system 400 can be implemented in any of a wide variety of devices, such as computers (whether desktop, portable, handheld, kiosks, etc), image capture devices (e.g., camera 700 of FIG. 7, camera 815 of FIG. 800), etc. Alternatively, the red eye correction system 400 may be a standalone system for coupling to (or incorporation within) other devices or systems.

Another advantage of using a red eye candidate scoring system, instead of an absolute pass/fail system, is that the amount of red eye correction can be adjusted based on the score of the red eye. The score is indicative of a confidence level that the red eye candidate zone is an actual red eye. For a high-score red eye candidate zone, a more aggressive correction method may be used. For a low-score red eye candidate zone, a more conservative correction method may be used.

In block 410, the red eye correction system 400 receives the image, or a subset of the image comprising the actual red eye, and the corresponding red eye candidate score from the red eye detection system 300. Based on the score of the red eye candidate that has passed the minimum detection threshold, the determined actual red eye may undergo any one of a multiple correction levels.

In one embodiment, two correction threshold levels are implemented. In block 420, the red eye candidate score is checked against a first threshold, where the first threshold is a partial correction threshold. If the score is less than the partial correction threshold, the actual red eye is not corrected, as indicated in block 430. If the score is greater than or equal to the partial correction threshold, the score is then checked, at block 440, against a second threshold value, where the second threshold value is a full correction threshold. In the case the score is less than the full correction threshold and greater than or equal to the partial correction threshold, a first correction level is applied to the actual red eye, as indicated by block 450.

In one embodiment, in block 460, the first correction level is a conservative correction. In one embodiment, the identified red regions are diluted to a less noticeable hue. The first level of correction corrects a chroma value associated with pixels forming the actual red eye in the digital image. In one embodiment, a Gaussian filter is applied to the chroma channels of the red pixels in the pupil region. The first level of correction compensates merely pixels in an identified red eye candidate zone rather than compensating an entire pupil, iris, and white portion of the eye. Thus, correction is performed on identified red pixels in the actual red eye zone. Correction is not performed on identified non-red pixels in a bounding box formed around the actual red eye zone.

The first level of correction can change the chroma via Guassian filtering so that the bright red will not appear as red. The saturation changes from bright red to light red. For example, if the red eye correction algorithm wrongly picks-up a red polka-dot in a scarf around someone's neck and the red eye correction algorithm corrects it using the first level of correction, what the consumer sees is still a light red polka dot scarf.

In the case the score is greater than or equal to the full correction threshold of block 440, a second correction level is applied to the actual red eye, as depicted in block 470. In one embodiment, the second correction level is a more aggressive correction than the first correction level. The second correction level corrects the chroma and luminosity of the red pixels in the pupil region of the actual red eye. The second correction level may also correct to preserve the highlight of the eye and/or creating one if it doesn't exist during the aggressive correction. The second correction level may also create a "feathering" effect for the narrow ring between identified red pixels in the actual red eye and non-red pixels in the bounding box (to make the eye look more natural). In an alternative embodiment, correction may be applied to manually identified red eyes 480. Thus, the actual red eye is identified through manual identification and/or with the aid of a red eye detection algorithm.

First, a correction ratio is computed at block 471. The mean Red, Green, and Blue chroma values within the red region that required correction is computed. The correction ratio for the Red, Green, and Blue chroma values is computed, which when applied to the means, yield a target color and luminance.

Rcorrection=Rtarget/Rmean
Gcorrection=Gtarget/Gmean
Bcorrection=Btarget/Bmean

A dark reddish brown may be used as the target color for the chroma value correction which makes the corrected eyes appear more natural than black or gray as used in other algorithms. Also, the luminance of the original eye is not preserved. Based on experimentation, preserving the luminance will create ghostly looking eyes because the red pupil is usually brighter than the surrounding iris region.

Since the pupil should always be darker than the iris to look natural, the color channels are not boosted. That is, the correction ratios should always be less than or equal to one. This is accomplished by normalizing the correction ratios as shown below:

```
maxCorrection = Max(Rcorrection, Gcorrection, Bcorrection)
if (maxCorrection>1.0)
{
    Rcorrection = Rcorrection / maxCorrection
    Gcorrection = Gcorrection / maxCorrection
    Bcorrection = Bcorrection / maxCorrection
}
```

The location of highlight pixels is identified at block 472. The above correction ratios are applied to the RGB channels of all connected red pixels within the eye region except for highlight pixels. These glint or highlight pixels are slightly different from the ones computed during the detection step.

Experimentation has shown the eye does not look natural unless there is a highlight. Where there is no highlight in the original red eye, a highlight is created by computing a histogram of the eye region and designating n % of the pixels at the high end to be highlight pixels. The luminosity of highlight pixels are not corrected. Thus, the luminance of the highlight is guaranteed to always be brighter than the corrected pixels.

The correction ratio is applied to the red eye pixels that are not highlight pixels at block 473. The neighborhood ring around the red eye is identified at block 474. A diminishing correction ratio is applied to the ring at block 475. To avoid an abrupt change between corrected red pixels and their immediate neighborhood, a percentage of the correction is applied to a narrow ring of pixels around the red region. The amount of diminishing correction received by a pixel within the area of the narrow ring is determined by its distance from the red region. A feathering effect is thus created.

Note that since no correction is applied to pixels that are not part of the red iris or the immediate ring around the red iris both in the conservative and aggressive methods, the pupil pixels retain their original color. Blue eyes will still remain blue, for example, unlike other algorithms that tend to bleed red into the pupil area and changing blue to brown.

Further the red eye correction algorithm allows detecting a single red eye candidate above the preset threshold and applying the level of correction to a pair of eyes. The likely partner of the single red eye candidate above the preset threshold has its score raised above the correction threshold to receive at least the first level of correction.

In an embodiment, if the red eye correction algorithm does not find an eye pair, the algorithm penalizes the eye score by a certain amount. If the newly adjusted score is lower than the first correction threshold, the red eye correction algorithm would use Gaussian filtering on the chroma components only. However, if the eye candidate was found to be a strong eye before the pairing, its score may still be higher than the second correction threshold after the red eye pairing algorithm penalizes it, in which case it will get the full correction. This is to allow the designer of the system the ability to adjust the score thresholds to determine how aggressive the red eye correction algorithm is at red eye correction.

The detection and correction steps can be stand-alone processes. For example, the automatic correction step may be applied to correct red eyes that were manually labeled by a user. The verification portion, module 325, of the red eye detection method may be used independently to verify the user's manual labels.

From the discussion of pairing of eyes above, the red eye detection step may be used as the front end to a face detection algorithm. With high quality images, face recognition may be performed by identifying and matching key facial features and their proportions and spatial relationships to each other.

The embodiments disclosed herein may also be applied to detection and correction of pixels of a different color in the captured digital image than their natural color. For example, in very dark digital images where a subject is far away from the camera, the eyes may appear yellow and green, rather than red. In other cases, the eyes of animals appear in the image as a different color than their natural color. These enumerated variations are not to be seen as exhaustive. The algorithm can be extended to detection and correction of a wide range of colors extensive modification to the main framework.

Figure 5:
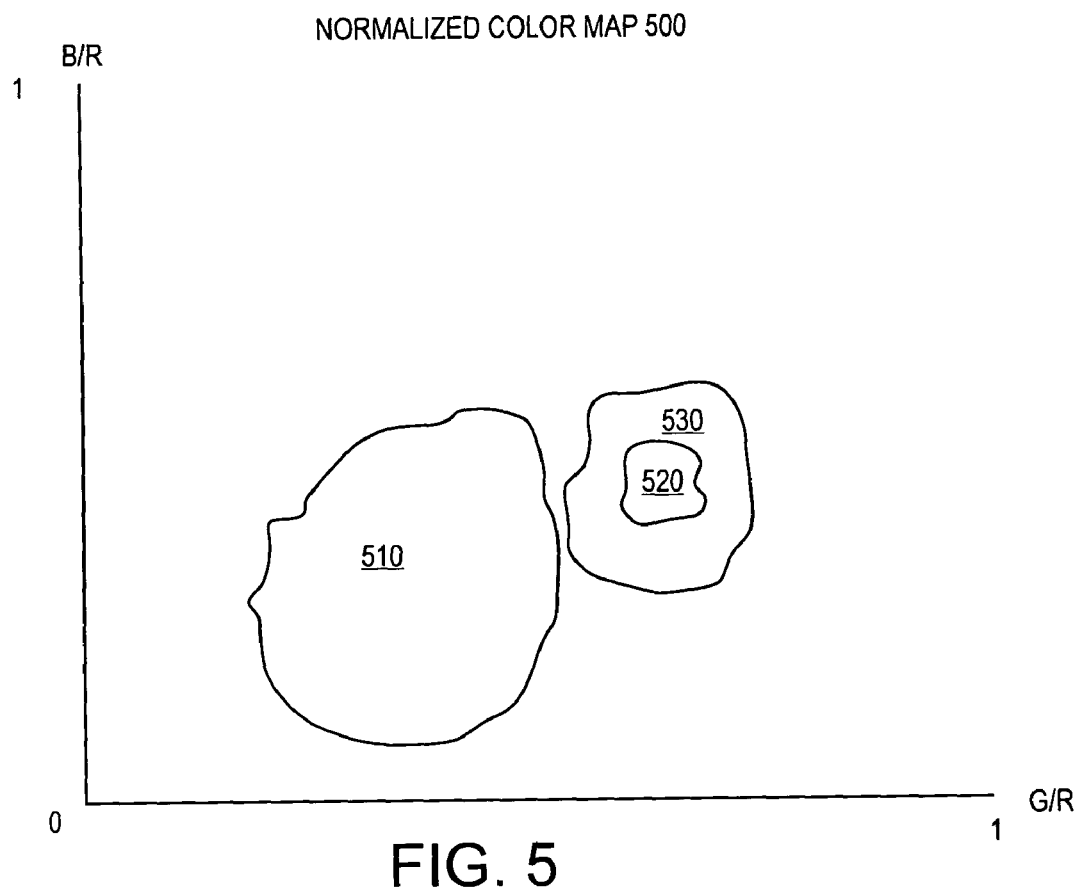
FIG. 5 illustrates an embodiment of a normalized color map.

FIG. 5 illustrates an embodiment of a normalized color map. The skin model 510 is a model for skin tones. A database of flash shots under varying ambient light is used to construct the skin model. It is essential to note that every camera-type produces colors differently. Because, each skin model depends on the characteristics of the camera type, the skin model may be tuned for each camera type for optimal performance.

The red model 520 is a model for red tones. The red model 520 is empirically determined from a database of possible red values that are visible to humans when seeing red eyes in an image. As previously discussed, differing camera-types produce colors differently, and thus the red model may be tuned for each camera type for optimal performance.

The expanded red model 530 is a model for expanded red tones. By loosening the definition of red, the red model is effectively expanded. As previously discussed, differing camera-types produce colors differently, and thus the red model may be tuned for each camera type for optimal performance.

Figure 6:
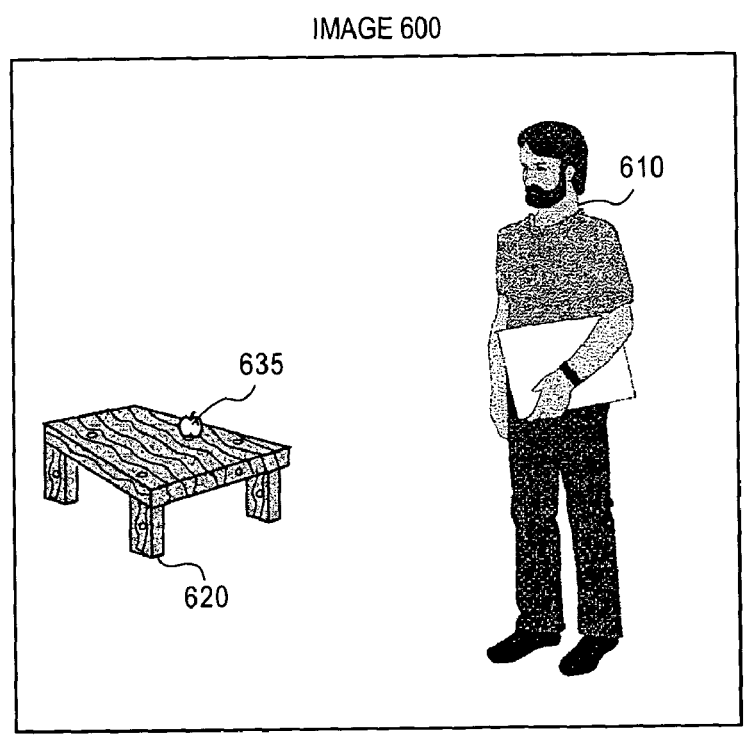
FIG. 6 illustrates an embodiment of a digital image.

FIG. 6 illustrates an embodiment of a digital image. Image 600 is received in digital format, but can be received from any of a wide variety of sources including sources that capture images in a non-digital format (e.g., on film) but that are subsequently converted to digital format (digitized). In the illustrated example, image 600 is made up of multiple pixels that can be referenced in a conventional manner using an x, y coordinate system.

The pixels of image 600 may be 24-bit and 48-bit color pixels that are represented using the conventional RGB (Red, Green, Blue) color model, in which three different dots (one red, one green, and one blue) are energized to different intensities to create the appropriate color for the pixel. The bits of color information identify the intensity that each of the three different dots is to be energized to in order to display the pixel. In another embodiment, bit depth may vary.

The human subject 610 includes skin areas on the face and on the arms of the subject. The inanimate subject 620 includes an amber-toned wooden lower section.

Figure 7:
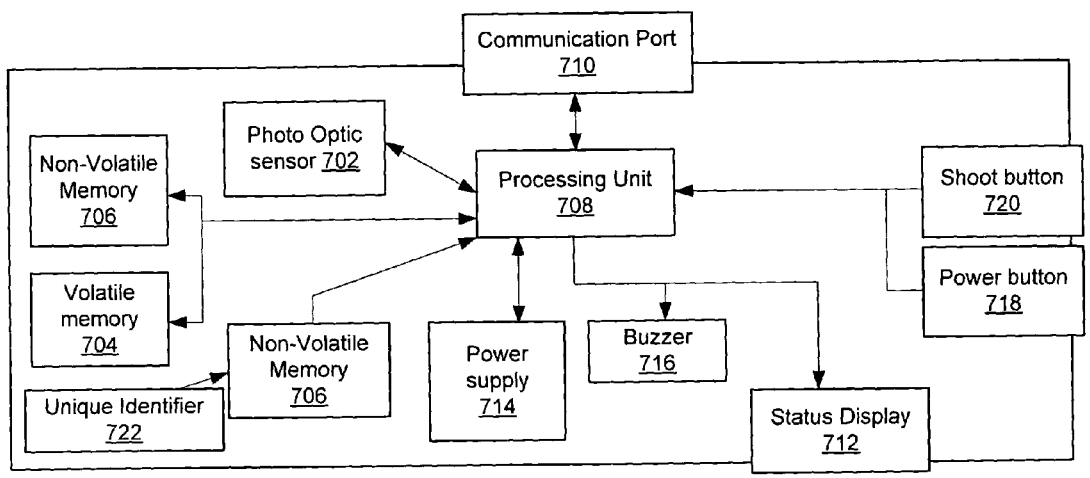
FIG. 7 illustrates an embodiment of a block diagram of a Digital One-Time-Use-Camera (Digital OTUC)

FIG. 7 illustrates an embodiment of a block diagram of a Digital One-Time-Use-Camera (Digital OTUC). In an embodiment, the digital OTUC 700 may have a photo optic sensor 702, such as 1280×1024 Pixel Complementary Metal Oxide Semiconductor or a Charge Coupled Device sensor, volatile memory 704, such as eight Megabytes of Synchronous Dynamic Random Access Memory, Non volatile memory 706, such as four Megabytes of internal flash memory and/or five hundred and twelve kilobytes of Read Only Memory, a processing unit 708, such as a micro-controller, one or more communication ports 710, such as a proprietary Universal Serial Bus-based interface, an optical view finder 724, a focus lens 726, such as a fixed focus lens, a status display 712, such as a multi-segment status Liquid Crystal Display, a power supply 714, such as batteries, an audio indicator 716, such as a buzzer 716, a power button 718 such as an On/Off button with automatic power-off on idle, a shutter release ("Shoot") button 720, a reset mechanism 721, an internal casing 728, and an external casing 730.

In an embodiment, the processing unit 708 executes the firmware instructions stored in the non-volatile memory 706 such as Read Only Memory copies the instructions to the volatile memory 704 for execution. The processing unit 708 controls the operation of the digital OTUC 700. The processing unit 708 may use portions of the volatile memory 704 to covert the data array information into an image format, such as a Joint Photographic Experts Group format. The raw image data is then stored in the non-volatile memory 706. The power supply 714 activates components within the digital OTUC 700 but once the image is captured and stored in a non-volatile memory 706, then the power supply 714 is no longer required to maintain the captured image data.

In an embodiment, the communication port 710 facilitates communications between the components internal to the digital OTUC 700 and devices external to the digital OTUC 700. Also, the communication port 710 may receive reset signal to allow the digital OTUC 700 to be used for another cycle. A propriety mechanism, such as a key, may communicate a physical or electronic signal through the communication port 710 to reset the digital OTUC 700 for another cycle. The optical viewfinder 724 allows a user to see the image of the photo to be taken and to target that area. The status display 712 visually communicates information, such as number of picture left to be taken, low lighting conditions, and other similar information.

Figure 8:
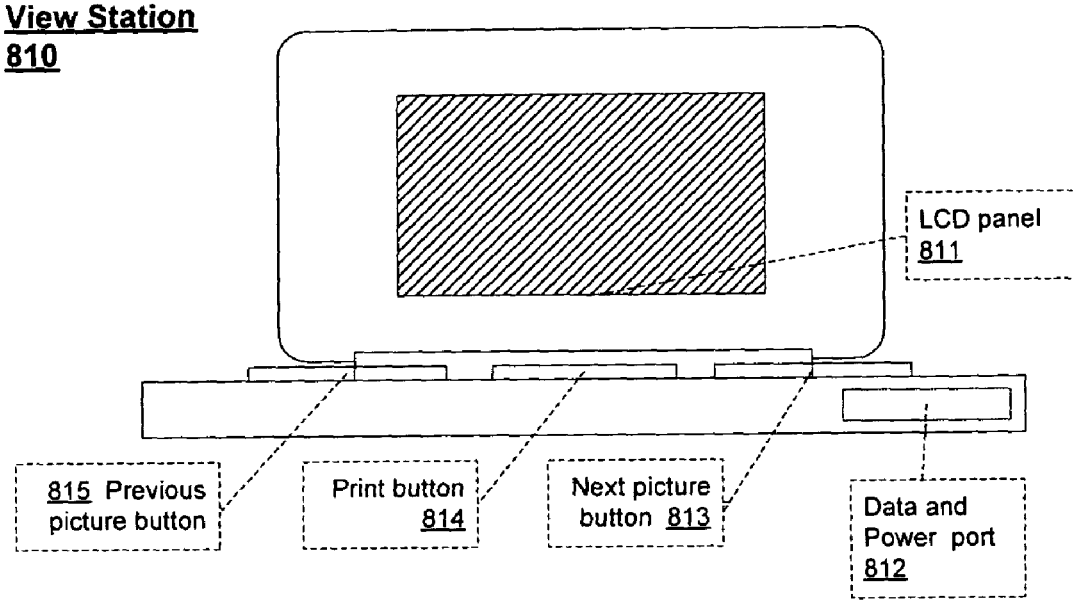
FIG. 8 illustrates an embodiment of a physical diagram of a camera and a view station.
Figure 8:
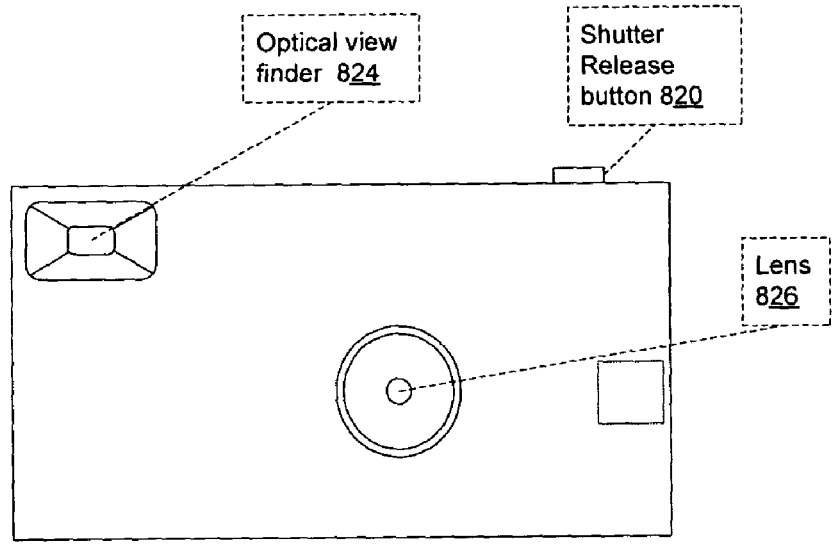

FIG. 8 illustrates an embodiment of a physical diagram of a camera and a view station. A camera 816 is used to take a picture(s) of subjects 610, 620 using a flash on camera 816 that potentially causes red-eye in images captured of subjects 610, 620. Camera 816 may be any type of image capture device that captures and stores (or communicates) images, such as a film camera, a digital camera, a video camera, a camcorder, the digital OTUC 700, etc. Camera 816 may capture images in any of a variety of conventional manners. Camera 816 may include optical view finder 824, shutter release button 820, and lens 826.

These images captured by camera 816 are analyzed for red-eye and the areas with red-eye automatically detected as previously discussed. The red-eye detection can be performed at camera 816, or alternatively the captured images may be transferred to the external processing unit 900 that detects red-eye via a view station 810.

In an embodiment, the view station 810 may contain Status display such as, a color LCD display 811, non-volatile memory such as 128K of ROM for firmware, volatile memory such as 8 MB of SDRAM, a micro-controller for firmware execution, a data and power port 812 for camera cradle connection, a data and power cable for external processing unit connection (not shown), a buzzer, and several user operation buttons such as a Next picture button 813, a Previous picture button 815, a print picture button 814, a mouse to allow a user to manually identify red eyes in the digital image, or other similar buttons/input devices.

The view station 810 may be used for picture viewing and printing selection. The view station 810 may be designed for use by the consumer and may be located over the counter. The view station 810 may be connected to an external processing unit with an appropriate type of cable. The view station 810 may include a color LCD display and a user interface for image browsing and print selection.

Figure 9:
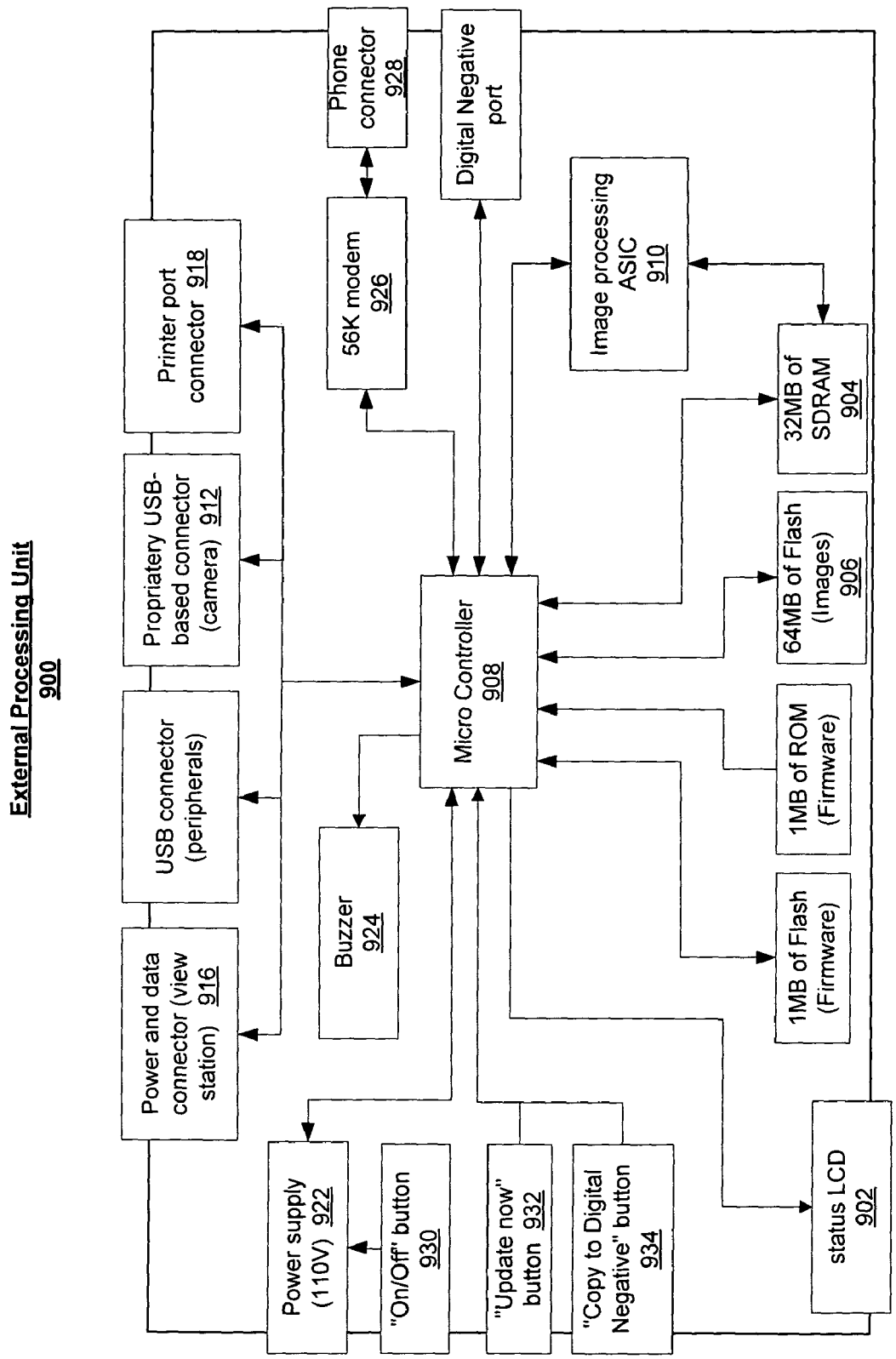
FIG. 9 illustrates a block diagram of an embodiment of an external processing unit.

FIG. 9 illustrates a block diagram of an embodiment of an external processing unit. In an embodiment, the external processing unit 900 may contain a status display 902, such as Multi-segment status LCD, volatile memory 904, such as 32 MB of Synchronous DRAM, non-volatile memory 906 such as 64 MB of internal flash memory, a processing unit 908 such as a Micro-controller for firmware execution, an image processing ASIC 910, a proprietary interface 912 for the digital OTUC, a standard port for peripherals and maintenance, a data and power port 916 for a view station connection, a printer port 918, a digital memory port for removable or portable memories such as a CompactFlash, SmartMedia or Memory Stick, a power supply 922, a buzzer 924, a modem 926, a phone connection 928, and several operation buttons such as a power button 930, an update now button 932, a copy to digital negative button 934, and other similar buttons.

The external processing unit 900 may be located as a retail-location device that enables the digital OTUC to get connected to other digital devices such as monitor, printers, email, etc. The external processing unit 900 may have several functions such as reading the data out of the digital OTUC, processing the image data and improving the quality of the image data such as reducing redeye in the digital images, and connecting the images with other devices. The processing unit 508 may implement the red eye detection algorithm as well as the red eye correction algorithm.

The external processing unit 900 may use a proprietary USB-based connection to read the pictures off the digital OTUC and store it in its internal non-volatile memory 906. Once the pictures are stored in its internal non-volatile memory 906 the external processing unit 900 processes the images and performs a series of procedures to ensure that the image quality is as high as possible. Once the processing stage is complete the image data is ready to be used by other devices such as a view station, a modem 926, a printer, a photo finishing Mini-lab, a computer or any other similar device.

The external processing unit 900 includes two docking bays: one for the digital OTUC and the other for removable digital storage media (called Digital Negative). The external processing unit 900 may be designed for use by the clerk in the retail location or by the consumer in a self service model.

A machine readable medium may be contained within a processing unit and the processing unit receives the digital image from a one time use digital camera.

The external processing unit may have multiple red models and skin tone models depending on the lighting conditions and the digital camera type. Thus, a redeye candidate in a first digital image captured by a first camera type is compared against a first skin model and a first red model. However, a redeye candidate in a second digital image captured by a second camera type may be compared against a second skin model and a second red model. The first skin model is different from the second skin model, and the first red model is different from the second red model.

Further, the external processing unit may have more than one red model and more than one skin model per camera type. For example, in certain cameras, the color of skin is different under fluorescent as opposed to incandescence lighting, so it would be necessary to apply different skin models depending on the lighting. This is in addition to the claim that each type of camera may need its own set of skin and red models for optimal performance.

The information representing the red eye correction or detection apparatuses and/or methods may be contained as instructions in a machine-readable medium storing this information. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; CD-ROM, DVD's, electrical, optical, acoustical or other form of propagated signals (e.g., carrier waves, infrared signals, digital signals, Electrically Programmable ROMs, Electrically Erasable PROMs, FLASH memory, magnetic or optical cards, or any type of media suitable for storing electronic instructions.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. Two example levels of correction have been discussed but more could exist. The invention is to be understood as not limited by the specific embodiments described herein, but only by scope of the appended claims.

What is claimed is:

1. A non-transitory machine readable medium that includes instructions that, when executed by the machine, cause the machine to perform operations, comprising:
    computing a set of feature scores, wherein each feature score corresponds to a different eye feature and indicates the likelihood that the eye feature is present in a red eye candidate zone within an image;
    computing a red eye candidate score for the red eye candidate zone based on the set of feature scores;
    determining that the red eye candidate score exceeds a detection threshold value indicating that the red eye candidate zone corresponds to an actual red eye;
    applying a partial level of correction to the actual red eye when the red eye candidate score is less than a full correction threshold, or
    applying a full level of correction to the actual red eye when the red eye candidate score is greater than or equal to the full correction threshold.

2. The non-transitory machine readable medium that contains instructions of claim 1, wherein the partial level of correction corrects a chroma value associated with pixels forming the actual red eye in the digital image.

3. The non-transitory machine readable medium that contains instructions of claim 1, wherein the full level of correction corrects a chroma value and a luminance value associated with pixels forming the actual red eye in the digital image.

4. The non-transitory machine readable medium that contains instructions of claim 1, wherein the full level of correction creates a highlight in the actual red eye in the digital image.

5. The non-transitory machine readable medium that contains instructions of claim 1, wherein the full level of correction corrects a ring around the actual red eye using a diminishing correction ratio.

6. The non-transitory machine readable medium that contains instructions of claim 3, wherein the chroma value is corrected toward a brown coloration.

7. The non-transitory machine readable medium that contains instructions of claim 1, which when executed by the machine perform the further operations, comprising: detecting a single red eye candidate above the preset threshold and applying the level of correction to a pair of eyes.

8. The non-transitory machine readable medium that contains instructions of claim 1, wherein the machine readable medium is contained within a processing unit and the processing unit receives the digital image from a one time use digital camera.

9. A computer-implemented method for red-eye correction, comprising one or more computers implementing in the following steps:
    computing a set of feature scores, wherein each feature score corresponds to a different eye feature and indicates the likelihood that the eye feature is present in a red eye candidate zone within an image;
    computing a red eye candidate score for the red eye candidate zone based on the set of feature scores;
    determining that the red eye candidate score exceeds a detection threshold value indicating that the red eye candidate zone corresponds to an actual red eye; and
    applying a partial level of correction to the actual red eye when the red eye candidate score is less than a full correction threshold; or
    applying a full level of correction to the actual red eye when the red eye candidate score is greater than or equal to the full correction threshold.

10. The method of claim 9, wherein the partial level of correction compensates pixels in an identified red eye candidate zone rather than compensating an entire pupil, iris, and white portion of the eye.

11. A computer system, comprising:
    a memory; and
    a processing unit configured to:
        compute a set of feature scores, wherein each feature score corresponds to a different eye feature and indicates the likelihood that the eye feature is present in a red eye candidate zone;
        compute a red eye candidate score for the red eye candidate zone based on the set of feature scores;
        determine that the red eye candidate score exceeds a detection threshold value indicating that the red eye candidate zone corresponds to an actual red eye; and apply a partial level of correction to the actual red eye when the red eye candidate score is less than a full correction threshold; or apply a full level of correction to the actual red eye when the red eye candidate score is greater than or equal to the full correction threshold.

12. The computer system of claim 11, wherein the memory stores instructions that, when executed by the processing unit, configure the processing unit to compute the set of feature scores, compute the red eye candidate score for the red eye candidate zone, determine that the detection threshold value is exceeded and apply the partial level of correction or the full level of correction.

* * * * *